United States Patent
Soong et al.

(10) Patent No.: US 8,565,773 B2
(45) Date of Patent: Oct. 22, 2013

(54) METHOD AND APPARATUS FOR ENABLING SOFT HANDOFF IN AN OFDMA-BASED COMMUNICATION SYSTEM

(75) Inventors: Anthony C. K. Soong, Plano, TX (US); Yunsong Yang, San Diego, CA (US); Jianmin Lu, San Diego, CA (US); Jung Woon Lee, Allen, TX (US)

(73) Assignee: FutureWei Technologies, Inc., Plano, TX (US)

( * ) Notice: Subject to any disclaimer, the term of this patent is extended or adjusted under 35 U.S.C. 154(b) by 829 days.

(21) Appl. No.: 11/685,037

(22) Filed: Mar. 12, 2007

(65) Prior Publication Data

US 2007/0224989 A1    Sep. 27, 2007

Related U.S. Application Data

(60) Provisional application No. 60/783,507, filed on Mar. 17, 2006.

(51) Int. Cl.
*H04W 36/00*    (2009.01)

(52) U.S. Cl.
USPC ........... 455/442; 370/331; 370/332; 455/443; 455/452.2

(58) Field of Classification Search
USPC ......... 370/203, 206, 208, 310, 311, 318, 328, 370/331, 335, 338, 342; 455/423, 436, 438, 455/439, 442, 443, 447, 450, 452.2, 458, 455/553.1, 562.1, 574
See application file for complete search history.

(56) References Cited

U.S. PATENT DOCUMENTS

| | | | |
|---|---|---|---|
| 5,664,108 A * | 9/1997 | Heaton et al. | 709/252 |
| 5,867,763 A * | 2/1999 | Dean et al. | 725/114 |
| 5,946,621 A | 8/1999 | Chheda et al. | |
| 5,956,641 A | 9/1999 | Bruckert et al. | |
| 6,038,450 A | 3/2000 | Brink et al. | |
| 6,047,186 A * | 4/2000 | Yu et al. | 455/446 |
| 6,069,871 A * | 5/2000 | Sharma et al. | 370/209 |
| 6,507,567 B1 | 1/2003 | Willars | |
| 6,654,363 B1 | 11/2003 | Li et al. | |
| 6,985,736 B1 | 1/2006 | Aalto | |
| 7,006,828 B1 * | 2/2006 | Czaja et al. | 455/442 |

(Continued)

FOREIGN PATENT DOCUMENTS

| | | |
|---|---|---|
| CN | 1653844 A | 8/2005 |
| EP | 1 189 468 A1 | 3/2002 |
| KR | 10-2004-0107535 | 12/2004 |
| WO | WO 2007/107090 A1 | 9/2007 |

OTHER PUBLICATIONS

"Soft Handoff Groups for LBC," Generation Partnership Project 2, Sep. 11, 2006, pp. 1-18, Huawei Technologies Co., Ltd., et al.

(Continued)

*Primary Examiner* — Wesley Kim
*Assistant Examiner* — Dinh P Nguyen
(74) *Attorney, Agent, or Firm* — Slater & Matsil, L.L.P.

(57) ABSTRACT

A method of enabling a soft handoff in a communication system, wherein the communication system includes a plurality of sectors and each of the plurality of sectors includes at least one base station is disclosed. The method includes: providing at least one mobile station; setting identical resources for serving the mobile station from each of the plurality of base stations in each sector; designating at least a plurality of base stations in at least one sector to participate a soft handoff; and performing a soft handoff.

17 Claims, 2 Drawing Sheets

(56) References Cited

U.S. PATENT DOCUMENTS

| | | | |
|---|---|---|---|
| 7,042,858 B1 | 5/2006 | Ma et al. | |
| 7,043,244 B1 | 5/2006 | Fauconnier | |
| 2002/0058511 A1* | 5/2002 | Mohebbi | 455/437 |
| 2002/0077124 A1* | 6/2002 | Hunzinger | 455/456 |
| 2003/0045321 A1* | 3/2003 | Kim et al. | 455/522 |
| 2003/0081538 A1* | 5/2003 | Walton et al. | 370/206 |
| 2003/0152174 A1* | 8/2003 | Burke | 375/349 |
| 2004/0132457 A1 | 7/2004 | Sanders et al. | |
| 2005/0197162 A1 | 9/2005 | Fujishima et al. | |
| 2005/0288025 A1 | 12/2005 | Yoshida et al. | |
| 2005/0288027 A1 | 12/2005 | Cho et al. | |
| 2006/0003767 A1* | 1/2006 | Kim et al. | 455/436 |
| 2006/0182063 A1 | 8/2006 | Ma et al. | |
| 2006/0252428 A1 | 11/2006 | Agashe et al. | |
| 2006/0285601 A1 | 12/2006 | Julian et al. | |
| 2006/0293056 A1 | 12/2006 | Kim et al. | |
| 2007/0097918 A1* | 5/2007 | Cai et al. | 370/331 |
| 2007/0135153 A1 | 6/2007 | Cai et al. | |
| 2007/0195742 A1 | 8/2007 | Erdman et al. | |
| 2007/0243871 A1 | 10/2007 | Chen et al. | |
| 2007/0268975 A1 | 11/2007 | Yoon et al. | |
| 2008/0025337 A1 | 1/2008 | Smith et al. | |
| 2008/0076429 A1 | 3/2008 | Comstock et al. | |
| 2008/0090574 A1 | 4/2008 | Soong et al. | |
| 2008/0268844 A1 | 10/2008 | Ma et al. | |
| 2009/0061778 A1 | 3/2009 | Vrzic et al. | |
| 2009/0129334 A1 | 5/2009 | Ma et al. | |
| 2009/0201872 A1 | 8/2009 | Gorokhov et al. | |
| 2010/0142471 A1 | 6/2010 | Cheng et al. | |

OTHER PUBLICATIONS

PCT International Search Report of PCT/CN2007/000848, form PCT/ISA/210, mailed Jul. 5, 2007, Applicant: Huawei Technologies Co., Ltd., 5 pages.

"Air Interface Evolution Framework Proposal," 3rd Generation Partnership Project 2, Mar. 27, 2006, pp. 1-68, Huawei Technologies Co. Ltd., et al.

* cited by examiner

METHOD AND APPARATUS FOR ENABLING SOFT HANDOFF IN AN OFDMA-BASED COMMUNICATION SYSTEM

PRIORITY CLAIM AND CROSS-REFERENCE TO RELATED APPLICATIONS

This application claims priority to and benefit of co-pending U.S. provisional patent application Ser. No. 60/783,507, filed on Mar. 17, 2006, entitled "Method and Apparatus for Enabling Soft Handoff in an OFDMA-Based Communication System" by Yunsong Yang, Anthony Soong, Jianmin Lu and Jung Woon Lee.

This application is related to: co-pending U.S. patent application Ser. No. 11/679,060, filed on Feb. 26, 2007, entitled "Method And Apparatus For Wireless Resource Allocation", by Yunsong Yang, Anthony C. K. Soong, Jianmin Lu, and Patrick Hosein; and U.S. patent application Ser. No. 11/685,079, filed Mar. 12, 2007, entitled "System For Minimizing Signaling Overhead In OFDMA-Based Communication Systems" by Jianmin Lu, Anthony C. K. Soong, Yunsong Yang, and Jung Woon Lee, both assigned to the assignee hereof and hereby expressly incorporated be reference herein.

TECHNICAL FIELD OF THE INVENTION

The present invention relates generally to wireless communications systems, and more particularly, to novel methods and apparatus for providing soft handoff in a wireless communication system.

BACKGROUND OF THE INVENTION

In a cellular communication network based on orthogonal frequency division multiplexing (OFDM), a base station communicates with mobile stations that are within the base station's coverage by using signals that are orthogonal in frequency. Moreover, current third generation (3G) systems achieve a significant increase in throughput over second generation (2G) systems by taking advantage of multi-user diversity gain. That is, for point to multipoint systems such as forward link systems, all resources of a base station are dedicated to a single user (also referred to as a mobile station).

Whenever possible, a scheduler within the base station chooses the user with the best radio reception from among a set of users. If the set of users is large enough and if the channel fading of each user is independent, there is almost always a user with good radio reception. Consequently, the base station avoids the expense of sending information to a user with poor radio reception.

Furthermore, to facilitate mobility (the movement of a mobile station through a service area), a fast sector selection is employed. This technology allows the mobile station to quickly switch the transmission of data from one sector to another. It is important to realize that although the mobile station switches from sector to sector, the mobile station only receives a signal from only one sector.

For a mobile station at an edge of a cell (which is the boundary region between two or more sectors), even though the base station transmits to this mobile station with maximum power, the received signal is often received with very low power. As a result, this mobile station receives very poor radio reception and thus its data throughput is very low.

This has several effects on system performance. One effect is that if that particular mobile station requires a certain QoS, the base station must expend significant resources to serve this mobile station. The result of which is a significant decrease in total system throughput. Another effect is that the perceived user experience for that mobile station is very poor due to the fact that the data rate sustained with that link is very low. This is a significant issue because users expect to have the level of service regardless of where they are located in the sector.

SUMMARY OF THE INVENTION

Given the previously described state of the art, the present invention contemplates that methods and apparatus to increase the throughput of users at the edge of a cell are now needed. In response, the present invention discloses novel methods and apparatus for soft handoff in a communication system—particularly an OFDMA-based communication system.

In accordance with the present invention, resources that are used to serve a mobile station, whether these resources are in the distributed assignment zone or localized assignment zone, must be the same. In addition, an identical hopping pattern of sub-carriers is set, especially in an OFDM system for resources assigned by a scheduler. The methods and apparatus of the present invention also provide a variety of schemes of using pilot signals to detect single or combined soft handoff signals, grouping sectors into a plurality of soft handoff groups, creating a list of potential soft handoff sectors, and using a channel quality information feedback for managing sectors that participate in the soft handoff.

The present invention provides soft handoffs for mobile stations at the edge of a sector with reliable and minimal signaling overhead, and thus improves the performance of the system.

The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The present invention provides unique methods and apparatus for soft handoffs in an OFDMA-based communication system. It is understood, however, that the following disclosure provides many different embodiments, or examples, for implementing different features of the invention. Specific examples of components, circuits, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

In a soft handoff, a mobile station receives data simultaneously from more than one sector. The same data is sent from multiple sectors. The sectors that send the same data are called the sectors that participate in the soft handoff. The signals from the participating sectors are combined in a radio channel for an OFDM system.

Consequently, in accordance with one aspect of the present invention, the resources that are used to serve the mobile station are the same in either a distributed assignment zone or a localized assignment zone. In one embodiment, where the soft handoff participating sectors are collocated in one cell site, a scheduler located at the cell (called a distributed scheduler) assigns the same resources to serve the mobile station and transmits the same data with the resources at each participating sector. As long as two signals in an OFDM transmission arrive at a mobile station within the period of the cyclic prefix, the mobile station can detect a combined signal with significant improvement in signal quality and consequently achieve higher throughput.

In accordance with another aspect of the present invention where participating sectors are from different cells, a centralized scheduler is used to assign the same resources to serve a mobile station in each sector. Consequently, a fast cell to cell communication is used to minimize the scheduling delay. In one embodiment, a base station includes a main module with a plurality of remote modules. The main module usually contains all base band processing of an entire cell while each of the plurality of remote modules usually contain all radio frequency processing for one sector of the cell.

Figure 1:
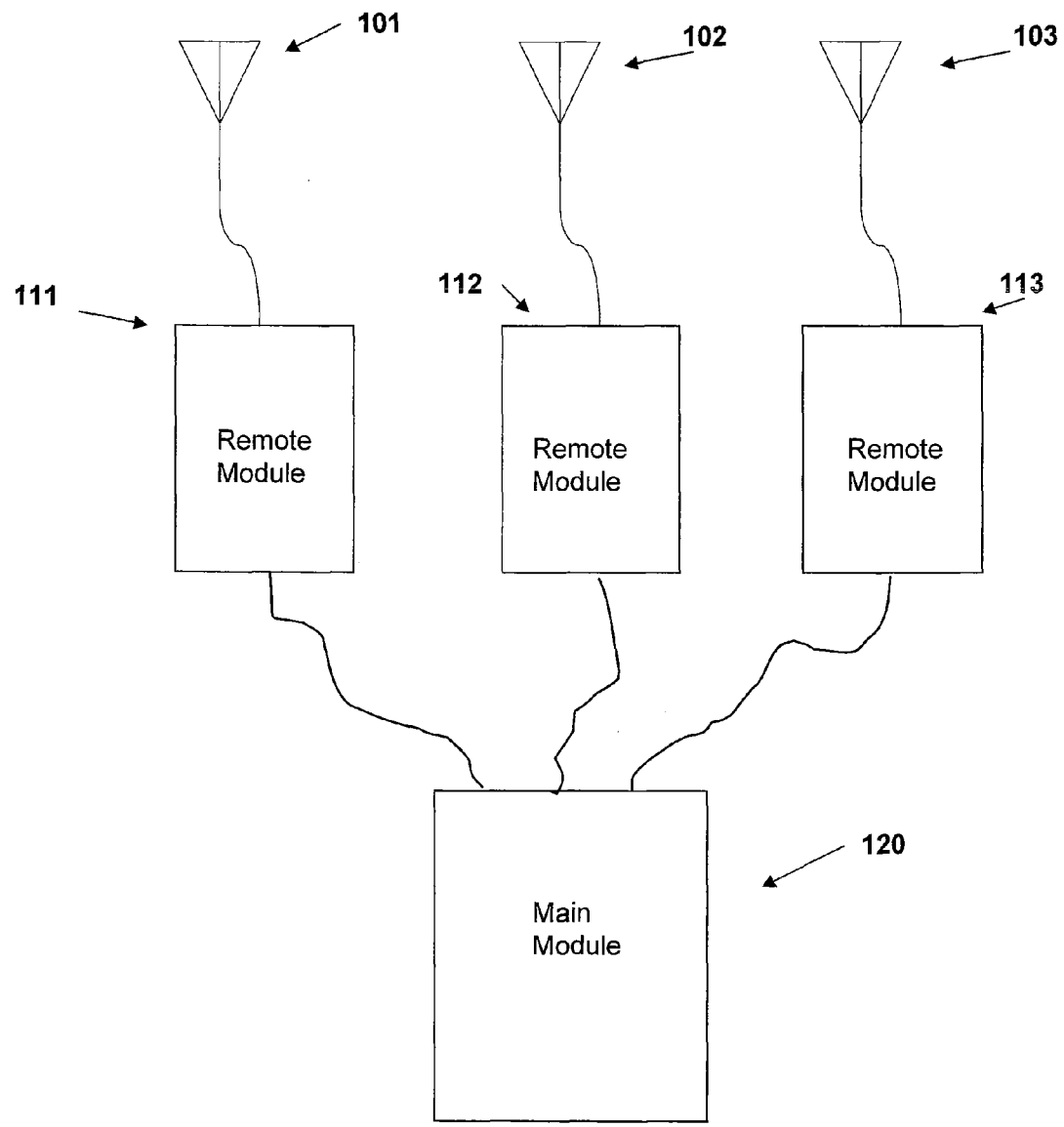
FIG. 1 shows an illustrative example of one embodiment of a base station with a main/remote architecture in a communication system according to the present invention.

FIG. 1 depicts a base station with such an architecture. The architecture includes one main module 120 and three remote modules 111, 112, and 113 for a cell configured with three sectors 101, 102, and 103. In one embodiment, the main module 120 groups multiple cells together in a centralized location. This allows inter-cell communication to be performed via a backplane communication among the main module 120 and other main modules in an OFDM system. It should be clear to those skilled in the art that once the main module 120 and each of the other main modules are centrally located, a variety of other inter-cell communications can be performed including, but not limited to, a fast Ethernet connection between the main modules.

In another embodiment, this inter-cell communication is accomplished through traditional backhaul communication. In another embodiment of the invention, dedicated inter-cell communication links are used to enable fast communication. In a cellular deployment, where it is not feasible to centrally locate all the main modules in one deployment, more than one of the previously described methods may be used simultaneously to achieve fast inter-cell communication.

In order to ensure that the same resources are used to serve a mobile station, hopping patterns in all participating sectors are similar in structure. In one embodiment of the invention, all sectors that belong to a same cell have the same hopping pattern regardless whether these sectors are or are not participating. Consequently, the hopping pattern is predetermined and can thus be communicated to the mobile station with minimal overhead. In another embodiment, a hoping controller is used such that the hopping pattern associated with the resources that are participating in soft handoff, is synchronized and dynamically communicated to the mobile station. In yet another embodiment, the resources associated with the soft handoff are excluded from hopping. It should be clear to those skilled in the art that one or more of these embodiments can simultaneously exist in a system.

According to another aspect of the invention, pilots are sent to aid the detection of the combined soft handoff. In one embodiment, a common pilot is sent from each base station. However, the phases of the common pilot from different base stations are different and are known at each of the base stations when these base stations are in soft handoff with each other.

For ease of notation, an embodiment will now be described for a case of two sectors participating in a soft handoff. A first Sector transmits pilot $P_1$ on a particular pilot subcarrier as well as data signal $S_1$ on a particular data subcarrier. A second sector transmits pilot $P_2$ on the same pilot subcarrier as well as data signal $S_2$ on the same data subcarrier. The phase rotation, denoted as A, is between pilot P1 and pilot P2. The first Sector is designated as a reference base station. A base station can obtain an estimate of a phase rotation, denoted as A', for a data subcarrier from interpolation of the A quantities of two pilot subcarriers that are adjacent to the data subcarrier. In the case when the second Sector transmits the same data symbol but with a phase shift, $S_2 = S_1 * A'$, a received pilot signal at the mobile station is given by:

$$R_{pilot} = H_1 P_1 + H_2 P_2 = (H_1 + H_2 A) P_1,$$

where $H_1$ and $H_2$ are the channel frequency responses for the transmissions from the first Sector and second Sector respectively. It is clear that the mobile station can now estimate the quantity $H = (H_1 + H_2 A)$ from the received pilots and estimate the quantity $H' = (H_1 + H_2 A')$ via interpolation. Furthermore, H' is precisely the channel estimate that is necessary for the detection of the data signal because the received data signal, $R_{data}$ is given by:

$$R_{data} = H_1 S_1 + H_2 S_2 = (H_1 + H_2 A') S_1.$$

More than two sectors may participate in soft handoffs in a similar manner. For the extension to more than two sectors in a system, the system chooses one of the sectors as a reference sector. In one embodiment, the reference sector is designated as an anchor base station in the soft handoff. Other choices of which a sector acts as the reference base station are possible. For example the sector with the best channel to the mobile station can be the reference base station.

If $A_i$ is a phase difference between the pilot signal from the i-th sector and first Sector, which is the reference sector, and $A'_i$ is a phase rotation at a data subcarrier obtained via interpolation as described above for the i-th sector, then a mobile station can estimate $$H = (H_1 + H_2 A_2 + H_3 A_3 + H_4 A_4 + \ldots)$$

from the pilot subcarriers and for data subcarriers $$H' = \text{interpolation}(H) = (H_1 + H_2 A_2' + H_3 A_3' + H_4 A_4' + \ldots)$$

Where interpolation( ) is the interpolation function. It is now clear that if the i-th base station transmits the data signal $S_i = A_i' S_1$, then H' is precisely the channel estimate that is needed to detect the data.

In another embodiment, a dedicated pilot is sent by participating sectors. The pilot pattern used for the dedicated pilot is the same for all participating sectors. Furthermore, the location of the pilot by both frequency and time are also identical. Consequently, the mobile station can estimate the composite pilot channel response directly.

In yet another embodiment of the invention, a mobile station makes use of a standard pilot that is already transmitted in any OFDM systems. In this embodiment, the mobile station estimates a channel from each of the participating sectors independently and then combines them to form a channel estimate for detection.

Although the different pilot structures are described independently, one or more of the embodiments described above may exist simultaneously in a system.

According to another aspect of the present invention, a setting of the transmit power in each of the participating sectors may be employed. In one embodiment of the invention, the transmit power from each of the sectors in a mobile station that are participating in the soft handoff are set to be the same. This setting of the transmit power is used to achieve equal gain combining. In this embodiment, no feedback is needed from the mobile station. In another embodiment, maximum ratio combining can be achieved by weighting the transmit power of the transmission from each sector by Channel Quality Indicator (CQI) feedback from the mobile station for that sector.

In this embodiment, more power is transmitted by the sectors that have a better link to the mobile station. In addition, the mobile station measures CQI from each of the participating sectors and reports that CQI back to the base station. Other types of combining can be achieved by various setting of the transmit powers from different sectors participating in the soft handoff. For example, combining can be achieved by setting the power of a sector with the best link to the mobile station to a maximum value while setting all other links to have a transmit power of zero. Although each power setting scheme above is described as a separate embodiment, a plurality of these schemes may exist in a system.

According to another aspect of the present invention, a management scheme for the participating sectors can be employed. In one embodiment, a mobile station keeps a list of potential handoff sectors. These sectors can potentially participate in the soft handoff of the mobile station. A decision to add a sector to the potential handoff sector list can be based upon the strength of the pilot from that sector. Thus, a sector is added to the potential handoff sector list if the pilot strength of the sector is above a certain threshold. The addition of the sector to the potential handoff sector list is communicated between the mobile station and base station via signaling messages.

As an illustrative example, a mobile station receives pilots and measures the strength of each of these pilots from each of sectors, then determines whether each pilot strength of each sector is above a certain threshold. The mobile station then sends a message to the base station indicating that a particular pilot strength of a sector is above the threshold. Upon receiving that message from the mobile station, the base station sends a message back to the mobile station to add this sector to the potential soft handoff sector list.

Furthermore, the base station groups sectors from this list together to form one or a plurality of soft handoff groups. That is, a soft handoff group is a subset of the potential soft handoff sector list. A soft handoff group may include one or more base stations. The number of soft handoff groups is determined by the base station. Many factors may be used to determine how a base station or an access network groups a plurality of sectors into soft handoff groups. These factors include, but are not limited to, sector location, and sector loading.

Figure 2:
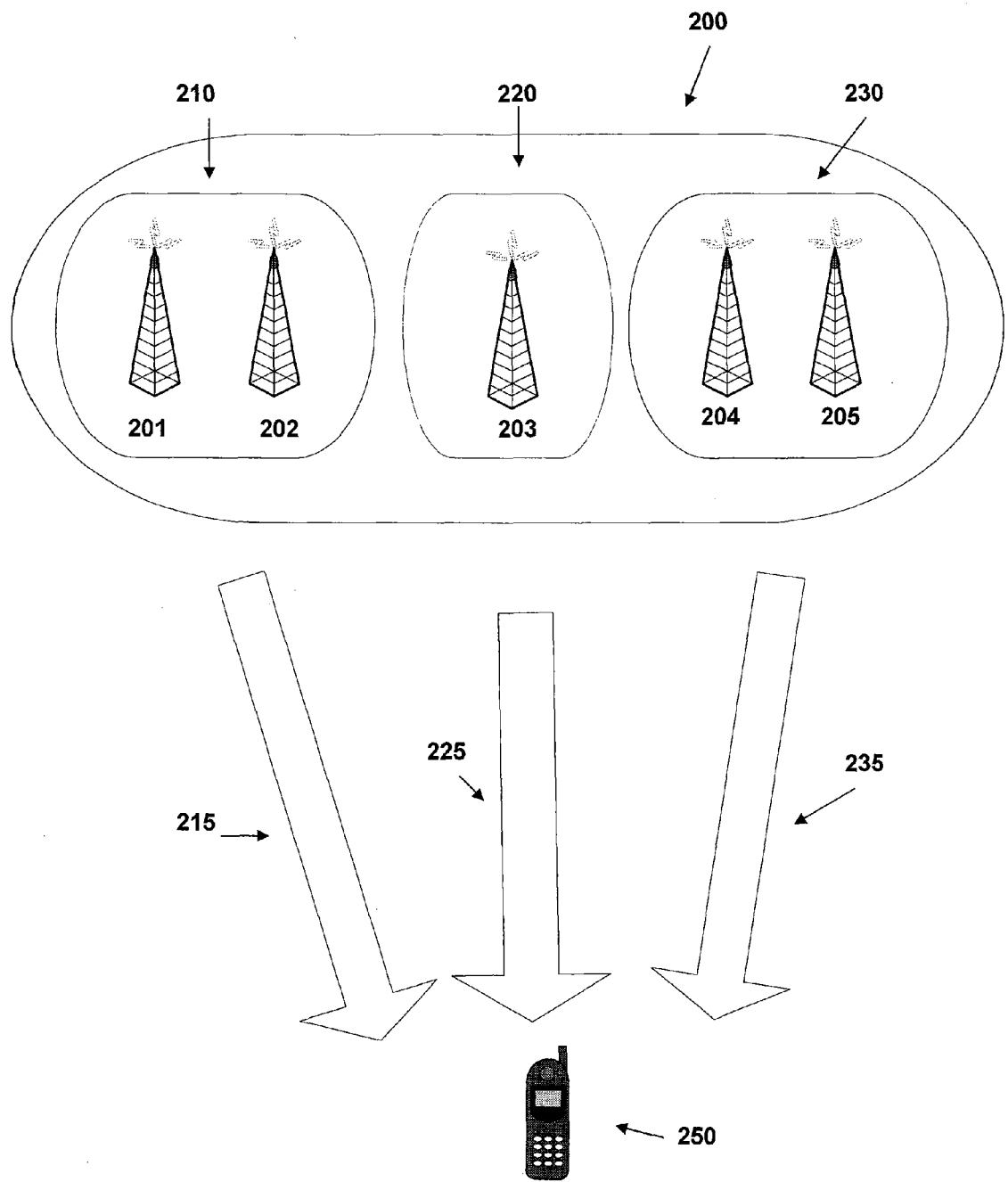
FIG. 2 shows illustrative examples of managing schemes for soft handoff sectors in a communication system according to the present invention.

For example, a base station or an access network may group all possible combinations of sectors in the potential soft handoff list. An example is illustrated in FIG. 2. In this example, a mobile station 250 is in a five way soft handoff region 200. This handoff region 200 includes five sectors, 201, 202, 203, 204, and 205. Sector 201 and Sector 202 are grouped as a soft handoff group 210, Sector 203 alone as soft handoff group 220, and Sector 204 and Sector 205 as soft handoff group 230. This grouping is done in such a fashion that sectors that belong to a same soft handoff group communicate with the mobile station 250 using the soft handoff procedure.

Specifically, Sector 201 and Sector 202 communicate with the mobile station 250 using the soft handoff procedure. However, Sector 203 does not communicate with the mobile station 205 using the soft handoff procedure since group 220 includes only one member, Sector 203.

In addition, Sector 204 and Sector 205 communicate with the mobile station also using the soft handoff procedure. However, at any one time, the mobile station 250 is served by only one soft handoff group. On the other hand, the soft handoff group that serves the mobile station 250 may switch from time to time. This ensures that the best group is used to serve the mobile station 250.

The soft handoff group that is used to serve the mobile station 250 may be switched in a fashion similar to that of fast sector selection. In one embodiment of the invention, the mobile station 250 measures the combined pilot strength of the sectors in each soft handoff group. In this example, mobile station 250 measures the combined pilot strength in soft handoff groups 210, 220, and 230, then chooses a soft handoff group with the largest combined pilot strength as the soft handoff group that the mobile station 250. This soft handoff group is called the desired soft handoff group. The mobile station 250 then communicates the desired soft handoff group to the base station via signaling.

For example, at a first time instance, the mobile station 250 determines that soft handoff group 210 has the highest combined pilot strength 215, the mobile station 250 then chooses soft handoff group 210 as the desired soft handoff group. The mobile station 250 then communicates to the base station via messaging. The base station that serves the mobile station 250 then uses soft handoff group 210. If the desired soft handoff group contains only one member, the data is transmitted only from that one sector. However, if the desired soft handoff group contains more than one sector, then data is transmitted from all sectors that are members of the group.

At a second time instance, the mobile station 250 determines that soft handoff group 230 has the highest combined pilot strength 235, chooses soft handoff group 230 as the desired soft handoff group, and gets service from soft handoff group 230. At a third time instance, the mobile station 250 determines that soft handoff group 220 has the highest combined pilot strength 225 and chooses soft handoff group 220 as the desired soft handoff group and gets service from soft handoff group 220. A fast sector switch occurs if the mobile station notified the base station that its desired soft handoff group changed and that the base station desires to switch service from the old desired soft handoff group to the new desired soft handoff group.

In one embodiment of the invention, the communication of the desired soft handoff group is done via a Walsh code on the CQI feedback channel. That is, a base station associates a unique Walsh code with every soft handoff group and communicates this unique Walsh code to the mobile station via signaling messages. The mobile station than signals the base station which soft handoff group is the desired soft handoff group by covering the transmission from the CQI feedback channel with the Walsh code associated with the desired soft handoff group. This embodiment is one method of communicating the desired soft handoff group and that other methods may also be used. These other methods may include, but are not limited to, using a layer three signaling message.

A base station, because of various reasons, may not be able to serve a mobile station with the desired soft handoff group signaled by the mobile station. In one embodiment of the invention, the base station may determine whether to accept or deny a desired soft handoff group via signaling messages. In this embodiment, the base station, upon receiving a new desired soft handoff group from the mobile station, decides whether the base station will serve the mobile station from the new desired soft handoff group.

If the base station accepts to serve the mobile station with the new desired soft handoff group, the base station sends an acknowledgement message to the mobile station and begins serving the mobile station from the new desired soft handoff group signaled by the mobile station. The base station may delay the time from which it begins serving the mobile station from the new desired soft handoff group by some period until it is sure that the mobile station has received the acceptance message.

For example, the base station may put an action time into the acceptance message. That action time means when the base station will start serving the mobile station from the new desired soft handoff group. In this way, the mobile station and the base station are synchronized to a time when the switch occurs. If the base station detects, for example, the loading on the new desired soft handoff group is too high, and decides to deny serving the mobile station from the new desired soft handoff group, the base station sends a denial message to the mobile station. In this case, the base station will not accept serving the mobile station from the new desired soft handoff group and that any service from the base station continues from the old desired soft handoff group.

According to another aspect of the present invention, CQI feedback may be employed in a system. In one embodiment of the invention, a composite CQI that represents the CQI of the combined soft handoff signal for the desired soft handoff group is sent in as feedback from a mobile station to a base station. This composite CQI is the strength of the total composite pilot from each sector in the soft handoff group. Other measures of the composite CQI may also be used.

For example, the composite CQI can be the weighted sum of the received powers of a pilot from each of the sectors in the soft handoff group. The base station then uses this CQI to select the modulation and coding scheme (MCS) for the data transmission. In another embodiment of the invention, an MCS or an MCS set based upon the combined pilot strength is sent as feedback to the base station by the mobile station. The base station then transmits the data with an MCS chosen from the MCS set if an MCS set is sent in the feedback.

In yet another embodiment of the invention, a set of individual pilot strengths for each sector in the soft handoff group is sent as feedback from the mobile station to the base station. In this case, the base station combines the pilot strength with, for example a weighted sum, and then based upon the combined pilot strength, chooses an MCS for the data transmission.

In yet another embodiment of the invention, the pilot strength of each of the sectors on the potential soft handoff list is sent as feedback from the mobile station to the base station. The base station, based upon that feedback, chooses an MCS or an MCS set.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of managing data transmission during a soft handoff in a communication system, the method comprising the steps of:
   generating, from a mobile station, a pilot signal strength report for each sector of a base station in communication with the mobile station, wherein the communication system is an orthogonal frequency division multiplexing (OFDM)-based system;
   receiving, at the mobile station, a plurality of soft handoff groups from the base station in accordance with the pilot signal strength report generated by the mobile station, wherein at least one of the soft handoff groups contains more than one sector;
   measuring, by the mobile station, a combined pilot signal strength of each combined pilot signal;
   selecting, by the mobile station, a desired soft handoff group in accordance with the measured combined pilot signal strengths;
   updating member sectors in the mobile station's current soft handoff group responsive to the desired soft handoff group;
   wherein the mobile station communicates the desired soft handoff group to the base station using a reverse channel quality indicator (CQI) channel;
   assigning a covering sequence for the reverse CQI channel for each soft handoff group that the base station forms for the mobile station;
   communicating to the mobile station the covering sequence for each soft handoff group;
   covering the reverse CQI channel by the mobile station with the covering sequence associated with the desired soft handoff group; and
   transmitting the reverse CQI channel by the mobile station setting a transmit power for the desired soft handoff group.

2. The method of claim 1, wherein each soft handoff group contains at least one sector.

3. The method of claim 1 wherein the base station determines grouping of sectors from a list of potential soft handoff sectors in accordance with a physical location of each sector.

4. The method of claim 1 wherein the base station determines grouping of sectors from a list of potential soft handoff sectors in accordance with a capability of fast backhaul communications between the sectors.

5. The method of claim 1 wherein the base station determines grouping of sectors from a list of potential soft handoff sectors in accordance with a traffic load condition of each sector.

6. The method of claim 1 wherein the covering sequence is a Walsh code.

7. The method of claim 1 wherein the base station updates member sectors in the current soft handoff group in accordance with the desired soft handoff group indicated, and its capability to support such a group.

8. The method of claim 7 wherein the base station accepts the desired soft handoff group as a current serving soft handoff group if the base station can support it, and denies it and continues to use an existing current serving soft handoff group as the current soft handoff group if the base station cannot support the desired soft handoff group.

9. The method of claim 8 further including communicating the acceptance of the desired soft handoff group to the mobile station by the base station.

10. The method of claim 1 further including using a same hopping pattern by each member sector of a given one of the soft handoff groups that the base station forms.

11. A base station for transmitting data to a mobile station in soft handoff, the base station comprising:
- a scheduler adapted to receive from a particular mobile station a desired soft handoff group request in accordance with a combined pilot signal strength comparison of potential soft handoff groups measured by the mobile station, wherein at least one of the soft handoff groups contains more than one sector, the scheduler adapted to assign, in accordance with the desired handoff group request, resources of a plurality of sectors that participate in soft handoff for transmission of particular data to the particular mobile station;
- a plurality of remote modules, each containing a radio frequency processing unit for at least one sector of the base station, wherein the base station is in an orthogonal frequency division multiplexing (OFDM)-based system;
- a main module that comprises base band processing units for the plurality of remote modules of at least one cell;
- a communicative connection between the plurality of remote modules and the main module;
- reporting a combined channel quality indicator (CQI) with the combined pilot strength from member sectors of the desired soft handoff group to the base station by the mobile station; and
- selecting a modulation and coding scheme (MCS) by the base station for the data transmission to the mobile station in accordance with the combined CQI report from the mobile station.

12. The base station of claim 11, further comprising a backplane that connects one main module with at least another main module.

13. The base station of claim 11, further comprising a fast inter-base station connection that connects one main module at a first base station with another main module at a second base station.

14. The base station of claim 11, further comprising a singular hopping pattern for sectors in the desired soft handoff group for the mobile station.

15. The base station of claim 11, wherein the scheduler is adapted to assign resources of the plurality of sectors from a list of potential soft handoff sectors in accordance with a physical location of each sector.

16. The base station of claim 11, wherein the scheduler is adapted to assign the plurality of sectors from a list of potential soft handoff sectors in accordance with a capability of fast backhaul communications between the sectors.

17. The base station of claim 11, wherein the scheduler is adapted to assign the plurality of sectors from a list of potential soft handoff sectors in accordance with a traffic load condition of each sector.

* * * * *